United States Patent [19]

Berger

[11] Patent Number: 4,468,753

[45] Date of Patent: Aug. 28, 1984

[54] INPUT/OUTPUT BUFFER CIRCUITRY

[75] Inventor: Michael F. Berger, Fort Worth, Tex.

[73] Assignee: Tandy Corporation, Fort Worth, Tex.

[21] Appl. No.: 304,173

[22] Filed: Sep. 21, 1981

[51] Int. Cl.³ .............................................. G06F 3/00
[52] U.S. Cl. ................................................... 364/900
[58] Field of Search ............................... 364/900, 200

[56] References Cited

U.S. PATENT DOCUMENTS

| | | | |
|---|---|---|---|
| 4,200,930 | 4/1980 | Rawlings et al. | 364/200 |
| 4,218,740 | 8/1980 | Bennett et al. | 364/200 |
| 4,253,148 | 2/1981 | Johnson et al. | 364/200 |

Primary Examiner—Felix D. Gruber
Assistant Examiner—Tim A. Wiens
Attorney, Agent, or Firm—Wolf, Greenfield & Sacks

[57] ABSTRACT

An input/output bus structure for a computer system is disclosed in which the computer's central processor is fully protected from "foreign" I/O devices in that all of the incoming and outgoing bus signals are buffered and the buffer stores can be disabled under software control. To attach an input/output device on the input/output bus, certain requirements, both hardware and software, must be met. The input/output bus is enabled by writing a predetermined bit pattern to a preselected output port. In response to the bit pattern, hardware in the input/output port enables the input/output bus tranceivers to receive and send information.

10 Claims, 3 Drawing Figures

INPUT/OUTPUT BUFFER CIRCUITRY

FIELD OF THE INVENTION

This invention relates to digital computer circuitry and in particular to input/output (I/O) bus structure.

BACKGROUND OF THE INVENTION

A typical computer system is comprised of a central processing unit, a memory and a plurality of input/output units which might be keyboards, displays or the like. Under control of a program stored in the memory, the central processing unit performs computations on data which is either stored in the memory or received from the input/output devices, such as keyboards or magnetic tape recorders. The program for the operation of the computer is also typically entered via an I/O device. The results of a computation or the contents of the memory may be displayed on output devices such as printers or video display terminals.

Normally, input/output devices such as printers or keyboards are interfaced to the central processing unit by use of an input/output bus. This "bus" consists of a set of leads which are connected in parallel to all of the input/output devices. The set of leads is divided into address leads and data leads. The address leads carry a code generated by the central processing unit which selects a particular input/output or "peripheral" unit. Each peripheral device has decoding circuitry in it which is sensitive to a particular combination of digital information appearing on the address lead. When the particular combination appears the device becomes active and exchanges information with the central processing unit.

A problem arises in this arrangement when "foreign I/O devices" are attached to the input/output bus. A foreign I/O device may be an input/output device incorrectly attached to the system or an equivalent of a foreign I/O device may result if the input/output bus is simply left unterminated. In either case, improper signals or noise may be introduced into the computer through the input/output bus. If the computer is not able to recognize these signals as improper or as noise, it may act upon them as if they were proper data with the result that the actual data in the storage may be corrupted by noise signals and other totally random information.

In large computer systems, the foreign I/O device problem is not particularly significant since the operating software in such a system is tailored to the actual physical configuration. Each input/output device has a software "driver" program associated with it which receives and interprets signals on the input/output bus from that device. If a particular software driver is not present, the computer simply ignores signals from devices normally associated with the driver even though such signals may be present. Software drivers may be added or removed from the software operating system as desired in a process in which the operating program is tailored to the physical system configuration via a procedure known as system "set up", "system generation" or "sysgen".

In a small computer, however, the foreign I/O device problem is more severe because, in most small computers, the computer's operating program is permanently fixed in a read-only memory in the device at the time of manufacture and therefore software drivers for all possible peripheral devices must be included. It is therefore possible for noise or other improper signals to enter the system by means of the input/output bus when improper devices are attached or the bus is improperly terminated.

Prior art attempts to solve the foreign I/O device problem have included specialized plugs which are used to terminate the input/output bus to avoid noise problems when no peripheral units are attached and complicated synchronization schemes to ensure that signals are received from only desired input/output units.

It is an object of the present invention to provide a simple method for protecting a computer against foreign I/O devices.

It is a further object of the present invention to automatically enable and disable input/output devices under internal software control.

SUMMARY OF THE INVENTION

The foregoing problem is solved and the foregoing objects are achieved in one illustrative embodiment of the invention in which all input/output bus signals on the I/O bus are buffered and the buffer stores can be enabled or disabled under software control. For external devices using input ports, the user enables the devices by writing a specified combination of bits to a predetermined location by means of a user application software program. Hardware in the input/output bus interface circuitry is responsive to the specified combination of bits to enable transceivers which extend the input/output bus address, data and control signal lines to the input/output bus connector. Peripheral devices may then be attached to the connector and communicate with the central processor.

A BRIEF DESCRIPTION OF THE DRAWINGS

DETAILED DESCRIPTION OF THE INVENTION

Figure 1:
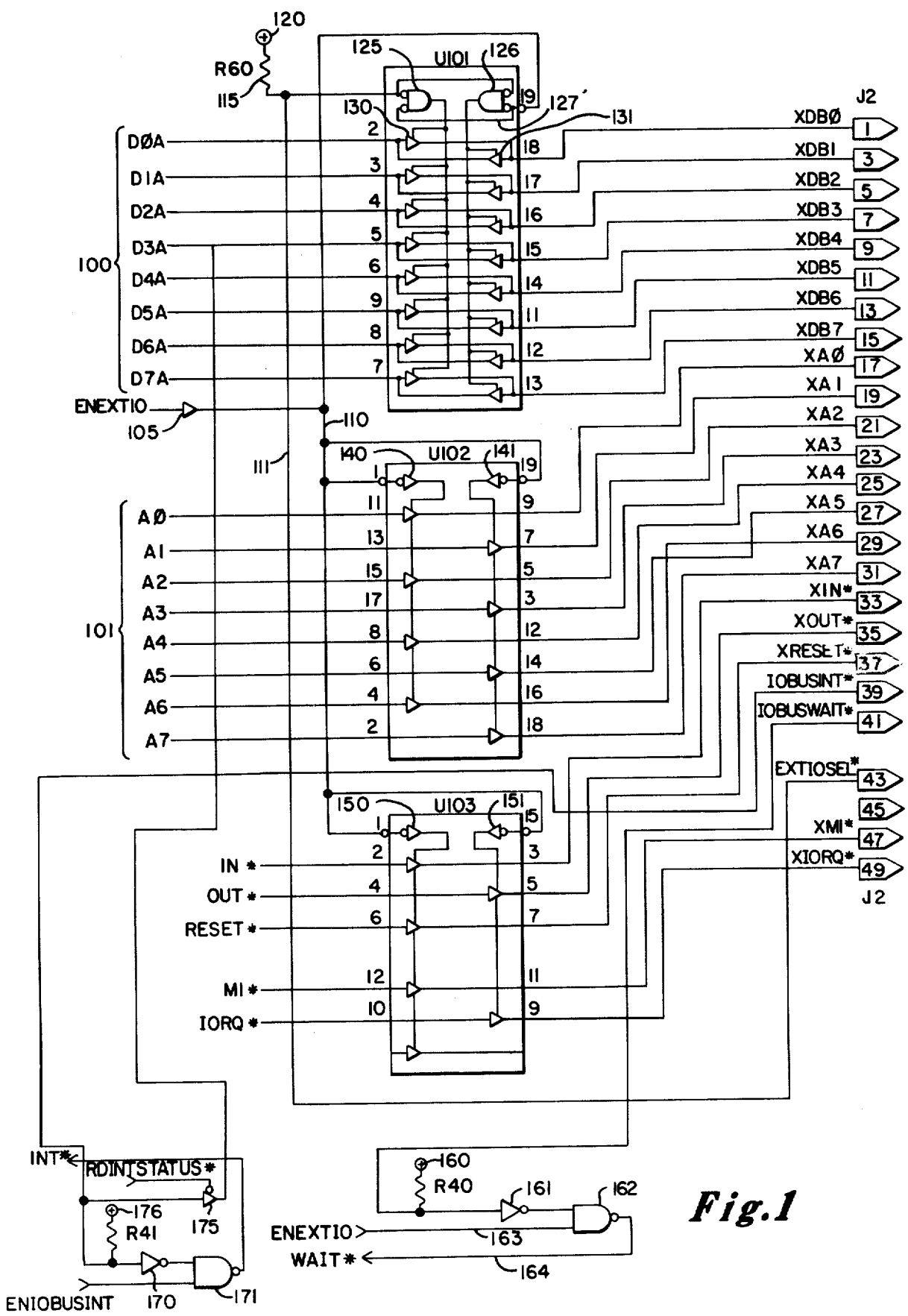
FIG. 1 shows a schematic diagram of the electrical circuitry in the I/O bus interface.

Referring to FIG. 1, communication between the central processing unit and peripheral devices takes place over several sets of leads connecting the two devices. Specifically, data is passed between the central processing unit and the peripheral devices via data leads 100, consisting of 8 leads D0A-D7A. The data leads are bi-directional and, therefore, data may be passed from the processor to the peripheral device or from the peripheral device to the processor. In addition, another set of leads, 101, is provided for sending address information from the central processor to the peripheral device to select a given peripheral device connected to the input/output bus. This set of address leads consists of eight leads A0-A7, however, information on these leads can only be transferred in one direction—from the processing unit to the peripheral device. A further set of leads comprising the input/output bus includes various control leads which will be described in further detail hereinafter. Signals on the control leads determine the direction of information transfer and the timing of information transfer between the central processing unit and the peripheral devices.

More particularly, data on leads 100 is transfered to and from the central processing unit and the peripheral devices under control of data bus transceiver unit U101. Each data lead is connected to two transceiver units which enable data to be transfered bilaterally between the data lead and its counterpart which is connected to the peripheral device. For example, data lead D0A is connected to both the input of transceiver unit 130 and the output of transceiver unit 131. By means of transceiver units 130 and 131 data may be transferred from lead D0A to lead XDB0 and from lead XDB0 to lead D0A.

The direction of data transfer over data leads D0A–D7A at any given time is controlled by gates 125 and 126 in unit U101. The upper input of both of these gates is connected via lead 111 to the EXTIOSEL* pin on the peripheral device edge connector J2. Normally, the upper inputs of both gates are held "high" by means of resistor R60 and voltage source 120. The "high" signal enables gate 125 and disables gate 126. This arrangement allows data to be transferred from leads 100 in the direction of the central processing unit to the peripheral device. When, however, a peripheral device wishes to send data to the central processing unit it applies a "low" signal to the EXTIOSEL* terminal, via connector J2, which, in turn, disables gate 125 and enables gate 126 thereby switching the transceivers and allowing information to pass from the peripheral device to the central processing unit.

In addition, in accordance with the invention, gates 125 and 126, at their lower inputs, are also connected, via lead 110 and invertor 105, to the ENEXTIO lead. The processor utilizes this lead to disable the input/output bus and prevent foreign I/O problems. As will hereinafter be explained in detail, extraneous signals and noise appearing on the data pins of the peripheral device connector can be prevented from reaching the central processor by disabling the data and address transceivers by signals on the ENEXTIO lead.

Address leads 101 are connected to transceiver unit U102. However, transceiver unit U102 contains only transceiver devices which allow information transfer from the central processing unit to the peripheral device. The transceiver devices in unit U102 are controlled by invertors 140 and 141 which are also, in turn, controlled by the central processor by means of signals on the ENEXTIO lead. As with signals on the the data leads, the transfer of address information from the central processing unit to the peripheral device can therefore be controlled internally by the computer. Similarly, the control function leads are controlled by transceivers located in unit U103. Unit U103 contains invertors 150 and 151 which, are also under control of the ENEXTIO lead.

In order to enable the input/output bus for the transfer of data between the central processing unit and a peripheral device, the central processor, under control of a user software application program, writes a digital "1" to a specified output port. The output port consists of a specified location in memory which stores a set of digital values and holds those values until they are changed. Each bit in the memory address word may be changed under control of the user application program to change the port output.

In accordance with the invention, the "high" output of the a specified bit position in the port memory word is applied to the ENEXTIO lead. This "high" signal is inverted by invertor 105 and applied as a "low" signal to lead 110, thereby enabling gates 125 and 126 and device U101. As previously described, these gates are then placed under control of the external peripheral device by means of terminal EXTIOSEL*. Similarly, the "low" signal on lead 110 is inverted by invertors 140, 141, 150 and 151 to turn on the transceiver units allowing control and address information to flow from the central processing unit to the external peripheral device.

Figure 2:
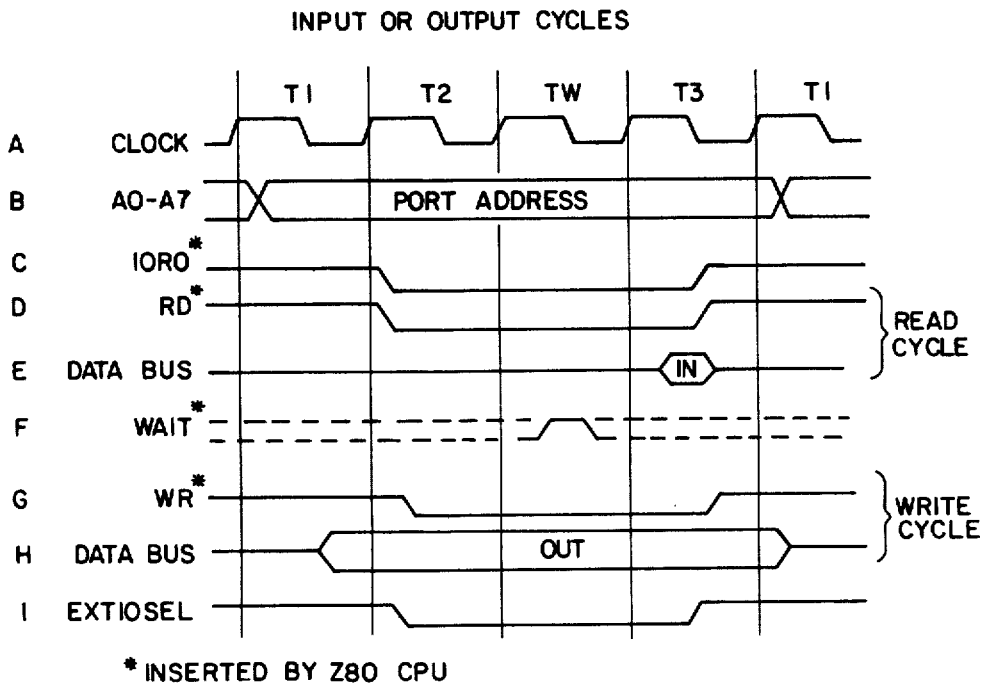
FIG. 2 is a timing diagram for computer peripheral operations.

Transfers of information between the computer and an external device take place under control of the system clock in what are normally called computer cycles. Under control of the system clock, the signals which control the input/output bus are carefully defined to prevent incorrect synchronization. FIG. 2 shows a waveform diagram for input/output bus signals during "read" and "write" functions performed on the bus.

In particular, line A of FIG. 2 shows the clock waveform which governs the transfer of data between the central processing unit and the peripheral devices.

To begin a "read" or "write" operation, as shown in line B of FIG. 2, during the first computer clock cycle or "T-state" the central processing unit puts the port address on the address leads A0–A7. As previously explained, the address port transceivers have been enabled at this point, and the address information is transfered from leads A0–A7 to the peripheral devices via leads XA0–XA7 on the peripheral device edge connector J2.

The timing waveforms for a "read" operation are shown in FIG. 2, lines C and D. During the second T-state the central processor places a low signal on lead IORQ* which indicates that the processor is performing an input/output request. In addition, to indicate that the operation is a "read" operation the processor places a "low" signal on the IN* lead.

The address and control signals produced by the processor and transferred by the input/output bus are received in parallel by all peripheral devices. Each peripheral device decodes the port address in response to the "low" signal on the IORQ* lead and the selected peripheral device responds by placing a "low" signal on the EXTIOSEL* lead during the second T-state as shown on line I of FIG. 2. As previously described the "low" signal on the EXTIOSEL* lead enables gate 126 and disables gate 125 in device U101, allowing data transfer from the peripheral device via leads XDB0–XDB7 (and the peripheral device edge connector J2) to data leads D0A–D7A.

Such a transfer of data normally takes place in the T-state following the T-state during which the EXTIOSEL* lead is asserted (a "low" signal is placed on it). However, in some cases, the peripheral device may request that the processor temporarily interrupt processing and "wait" until the information is available. This mode of operation allows slow devices, such as keyboards, to interface to the much faster central processing unit. In order to request a "wait" cycle the peripheral device places a "low" signal on the IOBUS-WAIT* lead. This signal is applied to the input of invertor 161 (which is normally held "high" by means of resistor R40 and voltage source 160). In response to the "low" signal on its input, invertor 161 applies a "high" signal to NAND gate 162, enabling it.

In accordance with the invention, however, NAND gate 162 must be enabled by a "high" signal on lead ENEXTIO before a "wait" state is reponded to. This condition prevents improper peripheral hookup or noise from interrupting the operation of the computer. If such a "high" signal is present on the ENEXTIO lead, NAND 162 produces a "low" signal on its output lead 164 which signal is applied to the WAIT* terminal and received by the computer. In response to a WAIT* signal during state TW of the system cycles, the computer halts processing and waits for a signal from the external peripheral device to resume processing.

When the peripheral device is ready to send the data, it removes the "low" signal from the IOBUSWAIT* lead which, in turn, causes NAND gate 162 to apply a "high" signal to the WAIT* lead. During the next T-state, the external unit places the incoming data as shown in line E of FIG. 2, on the data bus leads which data is then received by the central processing unit.

A "write" operation occurs in essentially the same manner as the "read" operation except that the computer asserts the OUT* lead by placing a "low" signal on it and the computer also places outgoing data on the data bus during the first T-state as shown in line H of FIG. 2. In response to the low signal on the OUT* lead, the selected peripheral device receives the data on the data bus lead and performs a write operation or the equivalent.

In addition to requesting the processor to halt processing by means of a WAIT signal, the peripheral unit may also perform an "interrupt" operation by placing a "low" signal on the IOBUSINT* lead. A "low" signal applied to this lead is applied to the upper input of inverter of 170 which is normally held "high" by resistor R41 and voltage source R176. In response to the "low" signal at its input, invertor 170 places a "high" signal on the upper input of NAND gate 171.

To prevent improper operation, as with the input/output bus, the interrupt operation must be enabled under control of the user application program by writing a "1" to a specified location. The "1" appears on terminal ENIOBUSINT which "high" signal enables gate 171. In response to the interrupt signal from the peripheral device, enabled gate 171 places a "low" signal on the terminal INT*. In response to the "low" signal on the INT* terminal, the operating system of the computer transfers control of the program to a user supplied address which has been previously written into a predetermined location. This allows the preipheral device to request the central processing unit to perform a specified subroutine upon specified conditions.

Figure 3:
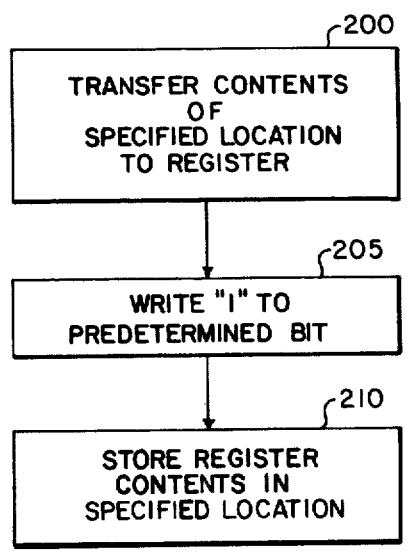
FIG. 3 is a flow chart of the computer software routine which enables the IO bus interface to receive signals from and send signals to attached peripheral units.

The computer routine which changes the value of the signal on the output port which controls the input/output bus circuitry shown in FIG. 3. As previously mentioned, the output port is a specified location in the memory of the computer in which each bit of the word stored in that location is connected permanently to a control lead. Thus, a signal written into the memory in a specified bit location appears on the control lead associated with that location. In order to change the output port status and enable or disable the input/output bus circuitry, the computer, in step 300, transfers the contents of the specified location memory corresponding to the output port into a register. In step 305, the predetermined bit location corresponding to the ENEXTIO lead is changed to a "1" in order to enable the input/output bus circuitry. In step 305 the register contents with the predetermined bit location set to a "1" is stored in the specified location and thereafter the lead ENEXTIO becomes "high" and enables the input/output buffer circuitry.

To disable the input/output buffer circuitry the same routine as shown in FIG. 3 is followed except that the predetermined bit location is set to a "0" which, as previously described, causes the interface hardware to disable the bus transceivers.

Although one illustrative embodiment of the invention has been shown other modifications and changes within the spirit and scope of the invention would occur to those skilled in the art. For example, it is apparent that different computer routines may be used to change the output port status.

What is claimed is:

1. In a computer system having a memory for storing a program, a central processing unit and at least one peripheral device connected to said central processing unit by means of an input/output bus and an address bus, said peripheral device being capable of sending information to, and receiving information from, said central processing unit over said input/output bus and under control of address signals on said address bus, apparatus for preventing noise present on said input/output bus from affecting operation of said central processing unit comprising, means cbntrolled by said program for inserting a predetermined control word into a specified location in said memory, means connected to said specified memory location and responsive to a predetermined bit of said control word for generating a disable signal, and gate means connected in series with said central processing unit and said input/output bus, said gate means being responsive to said disable signal for disconnecting said central processing unit from said input/output bus so that data cannot be transmitted between said central processing unit and said peripheral unit regardless of the presence of address signals on said address bus.

2. In a computer system, prevention apparatus according to claim 1 wherein said insertion means comprises means for reading said control word from said specified location into a register, means for modifying a predetermined bit of said control word, and means for storing the modified control word in said specified location.

3. In a computer system, prevention apparatus according to claim 2 wherein said generating means comprises means connected to said memory location and responsive to said predetermined bit for generating said disable signal only when said predetermined bit is in a predetermined digital state.

4. In a computer system having a memory for storing as program, a central processing unit and at least one peripheral device connected to said central processing unit by means of an input/output bus and an address bus, said peripheral device being capable of sending information to, and receiving information from, said central processing unit over said input/output bus and under control of address signals on said address bus, apparatus for preventing noise present on said input/output bus from affecting operation of said central processing unit comprising, program means for inserting a predetermined control word into a specified location in said memory, program means for reading said control word from said specified location into a register, program means for modifying a predetemined bit of said control word, program means for storing the modified control word in said specified location, means connected to selected memory locations including said specific memory location and responsive to said predetermined bit for generating a disable signal only when said predetermined bit is in a predetermined digital state, and bus transceiver circuitry connected in series with said central processing unit and said input/output bus, said bus transceiver circuitry responsive to data signals generated by said central processing unit to transmit said data signals to said peripheral unit and responsive to data signals generated by said peripheral unit to transmit said data signals to said central processing unit, said bus transceiver circuitry being further responsive to said disable signal for disconnecting said central processing unit from said input/output bus so that data cannot be transmitted between said central processing unit and said peripheral unit regardless of the presence of address signals on said address bus.

5. In a computer system having a memory for storing a program, a central processing unit and at least one peripheral device connected to said central processing unit by means of an input/output bus and an address bus, said peripheral device being capable of sending information to, and receiving information from, said central processing unit over said input/output bus and under control of address signals on said address bus, a method for preventing noise present on said input/output bus from affecting operation of said central processing unit comprising the steps of:

A. inserting a predetermined control word into a specified location in said memory, B. generating a disable signal when a predetermined bit of said control word is in a predetermined digital state, and C. disconnecting said central processing unit from said input/output bus in response to said disable signal so that data cannot be transmitted between said central processing unit and said peripheral unit regardless of the presence of address signals on said address bus.

6. In a computer system having a memory for storing a program, a central processing unit and at least one peripheral device connected to said central processing unit by means of an input/output bus and an address bus, said peripheral device being capable of sending information to, and receiving information from, said central processing unit over said input/output bus and under control of address signals on said address bus, a method for preventing noise present on said bus from affecting operation of said central processing unit comprising the steps of:

A. inserting a predetermined control board into a specified location in said memory, B. reading said control word from said specified location into a register, C. modifying a predetermined bit of said control word, D. storing the modified control word in said specified location, E. generating a disable signal only when said predetermined bit is in a predetermined digital state, and F. disconnecting said central processing unit from said input/output bus in response to said disable signal so that data cannot be transmitted between said central processing unit and said peripheral unit regardless of the presence of address signals on said address bus.

7. In a computer system, the apparatus according to claim 1 further comprising additional gate means responsive to said disable signal for disconnecting said address bus from said central processing unit so that address signals cannot be transmitted to said peripheral unit.

8. In a computer system according to claim 7 further having a control bus connecting said central processing unit and said peipheral unit for transmitting control signals from said central processing unit and said peripheral unit, the apparatus according to claim 1 further comprising control gate means responsive to said disable signal for disconnecting said control bus from said central processing unit so that control signals cannot be transmitted to said peripheral unit.

9. In a computer system, the apparatus according to claim 4 further comprising address bus transceiver circuitry for transmitting said address signals from said central processing unit to said peripheral unit, said address bus transceiver circuitry being responsive to said disable signal for disconnecting said address bus from said central processing unit so that address signals cannot be transmitted to said peripheral unit.

10. In a computer system according to claim 9 further having a control bus connecting said central processing unit and said peripheral unit for transmitting control signals from said central processing unit and said peripheral unit, the apparatus according to claim 9 further comprising control bus transceiver circuitry for transmitting said control signals from said central processing unit to said peripheral bus, said control bus transceiver circuitry being responsive to said disable signal for disconnecting said control bus from said central processing unit so that control signals cannot be transmitted to said peripheral unit.

* * * * *